(12) United States Patent
Chang

(10) Patent No.: US 6,935,876 B1
(45) Date of Patent: Aug. 30, 2005

(54) POWER SUPPLY RELEASING DEVICE

(75) Inventor: Hung-Jui Chang, Taipei (TW)

(73) Assignee: Acbel Polytech Inc., Taipei (TW)

( * ) Notice: Subject to any disclaimer, the term of this patent is extended or adjusted under 35 U.S.C. 154(b) by 0 days.

(21) Appl. No.: 10/779,346

(22) Filed: Feb. 14, 2004

(51) Int. Cl.⁷ .............................................. H01R 13/62
(52) U.S. Cl. ..................................... 439/157; 439/911
(58) Field of Search .............................. 439/157, 153, 439/152, 296, 188, 911

(56) References Cited

U.S. PATENT DOCUMENTS

| 4,632,588 | A | * | 12/1986 | Fitzpatrick | .................... | 403/16 |
| 4,840,574 | A | * | 6/1989 | Mills | .......................... | 439/191 |
| 5,269,698 | A | * | 12/1993 | Singer | ........................ | 439/157 |
| 5,435,737 | A | * | 7/1995 | Haga et al. | .................. | 439/157 |
| 5,616,038 | A | * | 4/1997 | Okamoto et al. | ........... | 439/157 |
| 5,989,043 | A | * | 11/1999 | Han et al. | .................... | 439/157 |
| 6,172,880 | B1 | * | 1/2001 | Petitpierre et al. | .......... | 361/801 |

* cited by examiner

Primary Examiner—Michael C. Zarroli

(57) ABSTRACT

A power supply releasing device is a one-piece plate which includes a handle and a fulcrum part on one side of the plate and an engaging piece extends from one of two ends of the plate. A protrusion extends from one surface of the plate. A hole and a curved slot are defined through the plate and a geometric arc formed by the curved slot has a center coincident with the center of the hole. Two rivets respectively extend through the hole and the curved slot and are connected to the power supply. When releasing the power supply, the user simply pivots the plate by pulling the handle to let the fulcrum part contact a vertical surface of the support frame and the power supply is pulled out relative to the support frame by the rivet in the curved slot in the plate.

9 Claims, 6 Drawing Sheets

POWER SUPPLY RELEASING DEVICE

FIELD OF THE INVENTION

The present invention relates to a power supply releasing device which is a one-piece plate and is pivotably connected to the power supply which can be easily pulled out from the power supply by way of levering the releasing device.

BACKGROUND OF THE INVENTION

A conventional power supply is used to be connected to a system which is then powered by the electric power. The power supply regulates the current from the power plant so as to meet the requirement of the systems which are designed to be powered by specific electric power. The power supply includes three major types which are UPS, SPS and LPS. The SPS is the most popular one and transfers the alternative current into direct current which powers most of the electronic systems. The conventional power supply is connected between the system and the power source that can be the power outlet on the wall. Nevertheless, the connection between the power supply and the system or between the power supply and the power outlet is often separated when pulling either one of two ends of the power supply and this cuts the power suddenly. In order to ensure that such sudden separation can be avoided, a power supply releasing device is developed which generally includes two parts to lock the power supply to the system. The two-part releasing device involves complicated structure and high manufacturing cost.

Therefore, it is desired to provide a releasing device that can be pivoted relative to the power supply and the support frame. The power supply can be pulled out relative to the support frame by levering the releasing device.

SUMMARY OF THE INVENTION

In accordance with an aspect of the present invention, there is provided a power supply releasing device which comprises a plate having a handle and a fulcrum part extending from a first side thereof. A hole is defined through the plate and a rivet extends through the hole and is connected to a power supply. The plate can be pivoted about the rivet and pulls the power supply out.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
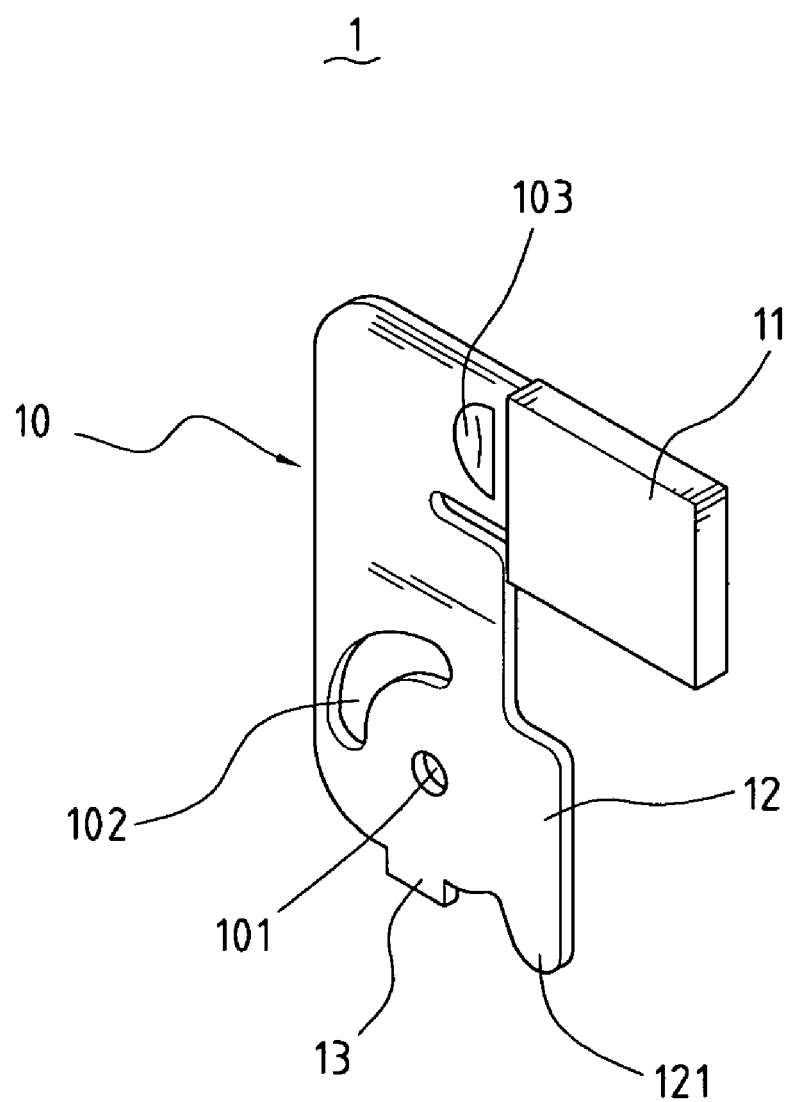
FIG. 1 is a perspective view showing a plate of a releasing device in accordance with the present invention.
Figure 2:
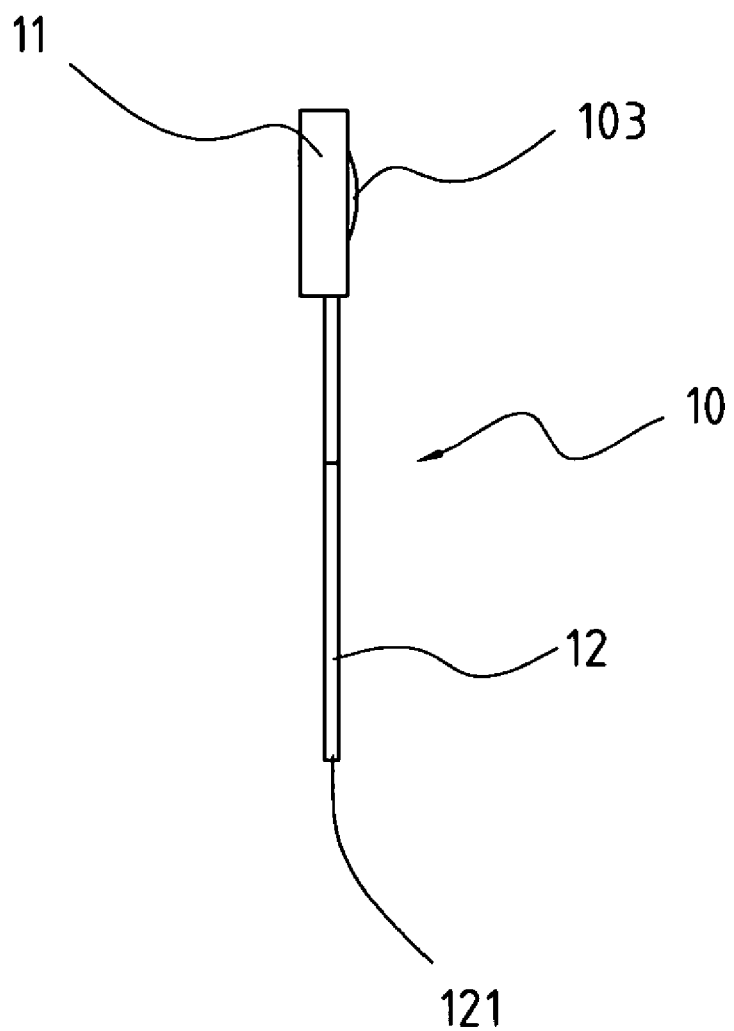
FIG. 2 is an end view of the plate of the releasing device.

Referring to the drawings and in particular FIGS. 1 and 2, the power supply releasing device 1 of the present invention comprises a plate 10 having a handle 11 extending perpendicularly from a first side thereof, an engaging piece 13 extending down at a bottom end, and a fulcrum part 12 extending from the first side of the plate 10 and located below the handle 11. The fulcrum part 12 includes a contact point 121 formed at a distal end of the fulcrum part 12. A semi-circular protrusion 103 extends from one surface of the plate 10 as shown in FIG. 2 and includes a flat end. A hole 101 and a curved slot 102 are respectively defined through the plate 10. A geometric arc formed by the curved slot 102 has a center coincident with the center of the hole 101.

Figure 3:
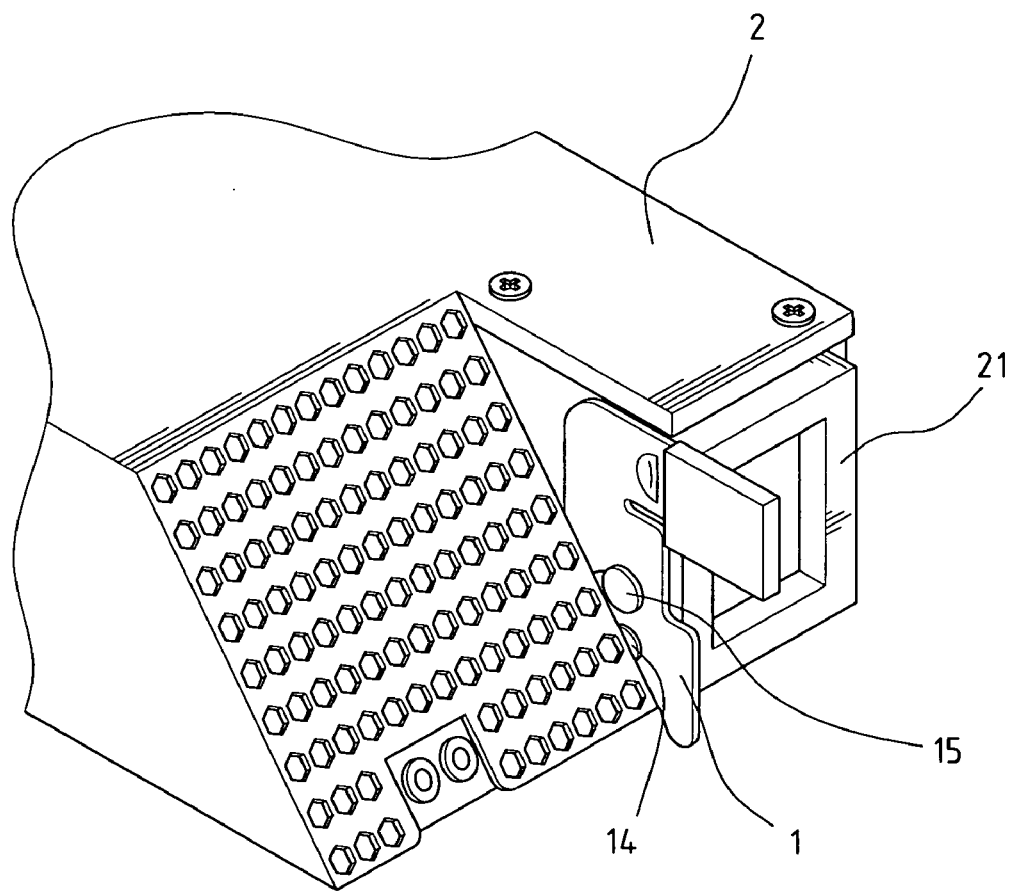
FIG. 3 shows that the plate is connected to a side of a power supply.
Figure 4:
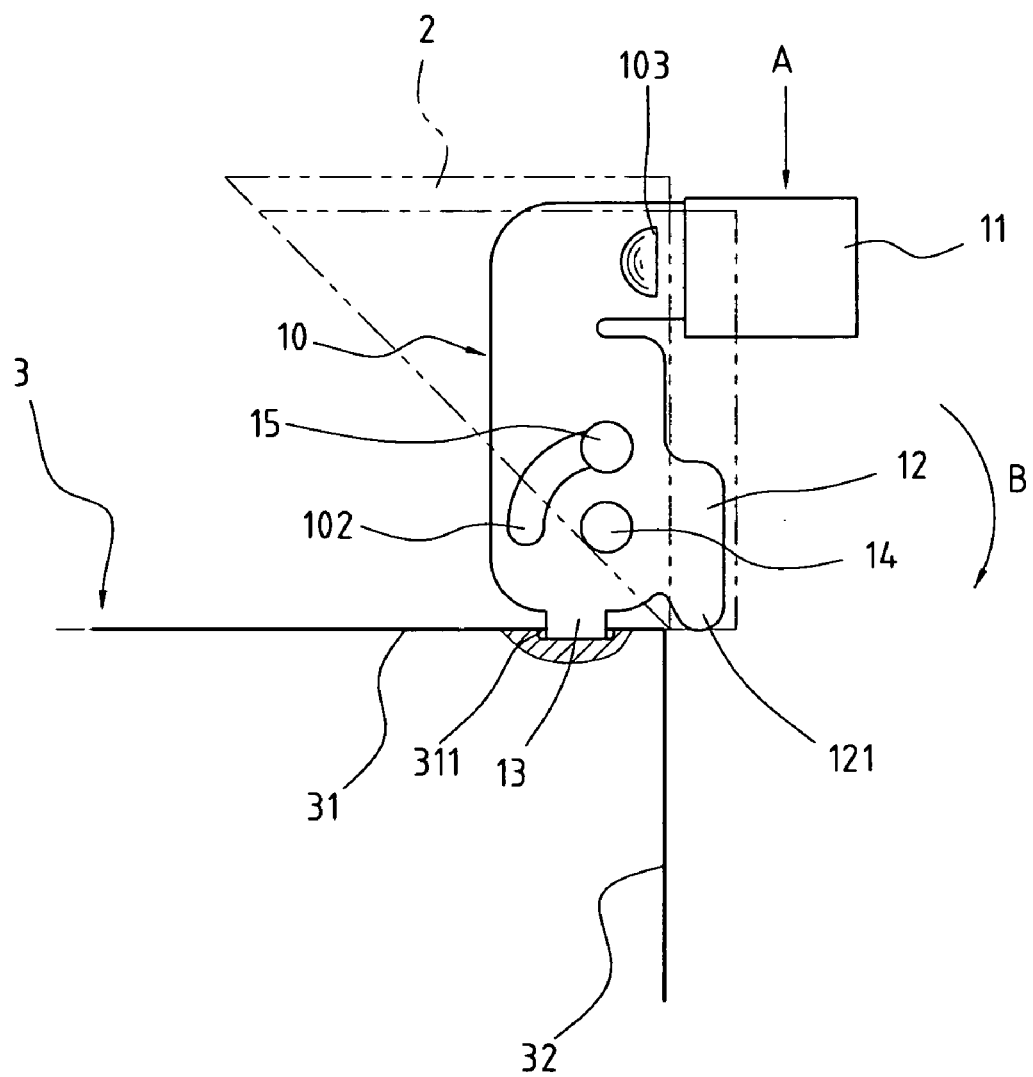
FIG. 4 shows the position of the plate and the power supply, a force being applied to a handle of the plate.
Figure 5:
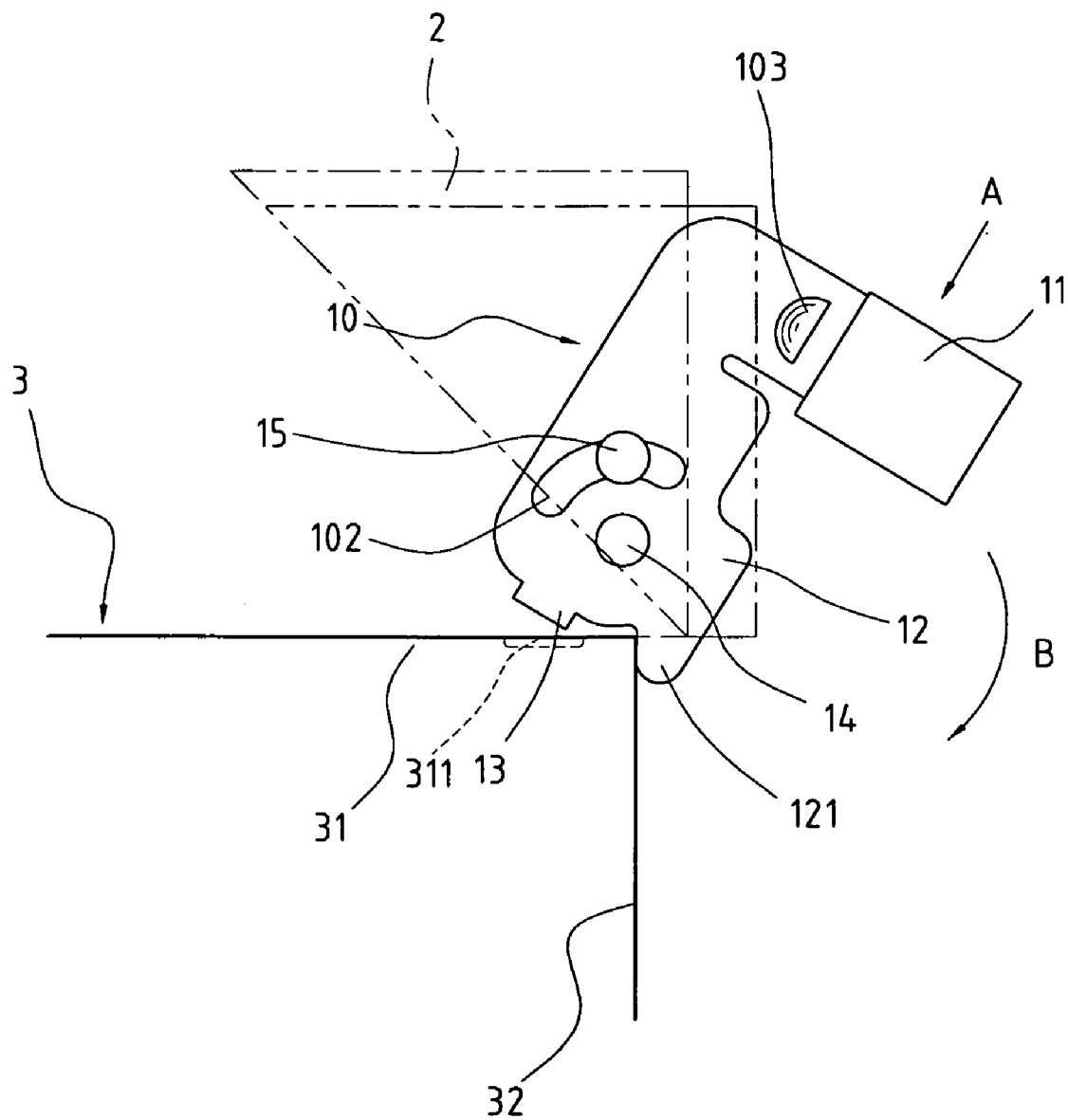
FIG. 5 shows that the plate is pivoted and the protrusion is disengaged from the power supply.

Referring to FIG. 3, the plate 10 is connected to a side of the receptacle 21 of a power supply 2 that is removably connected to a support frame 3 (FIG. 4). A rivet 14 extends through the hole 101 and is connected to the side of the power supply 2. Another rivet 15 extends through the curved slot 102 and is connected to the power supply 2. The protrusion 103 is engaged with a notch (not shown) defined in the side of the power supply 2. As shown in FIGS. 4 and 5, when the power supply 2 is to be released from a system that is powered by the power supply 2, the user simply pushes the handle 11 in a direction shown by the arrow "A". The plate 10 is pivoted about the rivet 14 as shown by the arrow "B" and the protrusion 103 is disengaged from the side of the power supply 2 and the rivet 15 is relatively moved in the curved slot 102 as shown in FIG. 5. It is noted that the protrusion 103 is disengaged from the notch (not shown) in the side of the power supply 2 and the fulcrum part 12 is co-rotated as shown in FIG. 5.

Figure 6:
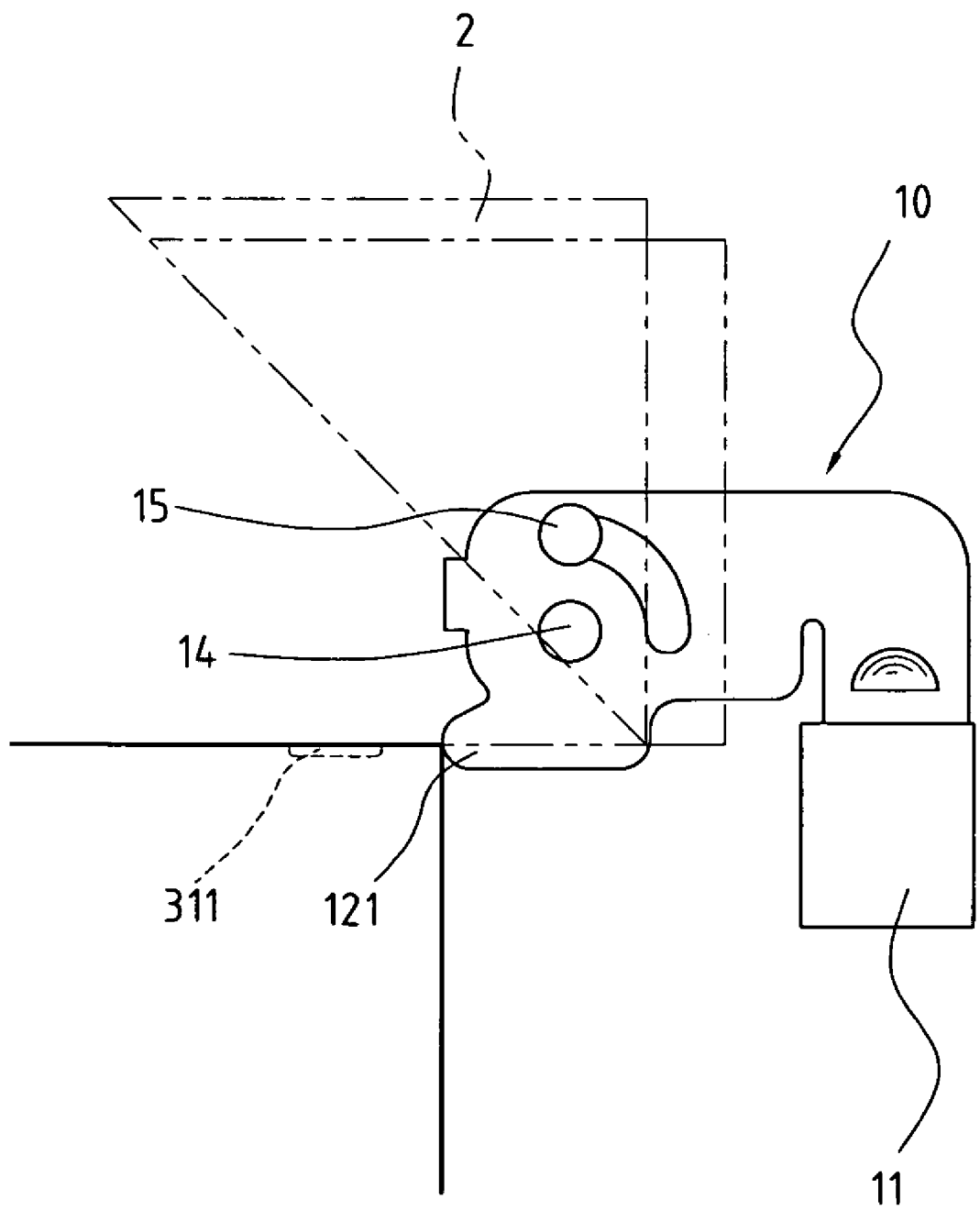
FIG. 6 shows that the plate is pivoted 90 degrees and the power is pulled out relative to the support frame.

As the plate 10 rotates along the arrow "B", the engaging piece 13 is moved away from a recess 311 formed on the horizontal surface 31 of the support frame 3 so that the plate 10 is disengaged from the support frame 3. As shown in FIG. 6, the user keeps on pushing the handle 11 till the contact point 121 on the fulcrum part 12 contacts the vertical surface 32 on the support frame 3, and the rivet 15 is moved to an end of the curved slot 102. The plate 10 is further pivoted, the power supply 2 is then levered at the contact point 121 and pulled out from its original position.

The handle 11 of the plate 10 has a heat-isolation layer coated thereon which can be a plastic material so that the user will not be hurt by the heat of the handle 11.

While we have shown and described the embodiment in accordance with the present invention, it should be clear to those skilled in the art that further embodiments may be made without departing from the scope of the present invention.

What is claimed is:

1. A power supply releasing device comprising:
    a plate having a handle extending from a first side thereof and a fulcrum part extending from the first side and located below the handle;
    a hole defined through the plate and a first rivet extending through the hole and connected to a power supply; and
    a curved slot defined through the plate and a second rivet extending through the curved slot and connected to the power supply;
    wherein a geometric arc formed by the curved slot has a center coincident with a center of the hole.

2. The power supply releasing device as claimed in claim 1, wherein a protrusion extends from a surface of the plate for engaging with the power supply.

3. The power supply releasing device as claimed in claim 2, wherein the protrusion is a semi-circular protrusion.

4. The power supply releasing device as claimed in claim 1, wherein the plate has an engaging piece extending from an end thereof for engaging with a recess in a support frame.

5. The power supply releasing device as claimed in claim 1, wherein the handle of the plate has a heat-isolation layer coated thereon.

6. The power supply releasing device as claimed in claim 5, wherein the heat-isolation layer coated on the handle is plastic material.

7. The power supply releasing device as claimed in claim 1, wherein the plate is connected to a side of a receptacle of the power supply.

8. A power supply releasing device comprising:
   a plate having a handle extending from a first side thereof and a fulcrum part extending from the first side and located below the handle; and
   a hole defined through the plate and a rivet extending through the hole and connected to a power supply;
   wherein the handle of the plate has a heat-isolation layer coated thereon.

9. The power supply releasing device as claimed in claim 8, wherein the heat-isolation layer coated on the handle is plastic material.

* * * * *